United States Patent

Zou et al.

Patent Number: 5,981,015
Date of Patent: Nov. 9, 1999

[54] METHOD FOR SELECTING A MATERIAL SUITABLE FOR A SUBSTRATE FOR INFORMATION RECORDING MEDIA, MATERIAL SELECTED USING THIS METHOD, AND MAGNETIC DISK FORMED USING THIS MATERIAL

[75] Inventors: Xuelu Zou; Hisayoshi Toratani, both of Tokyo, Japan

[73] Assignee: Hoya Corporation, Tokyo, Japan

[21] Appl. No.: 08/923,143

[22] Filed: Sep. 4, 1997

[30] Foreign Application Priority Data

Sep. 4, 1996 [JP] Japan ................................ 8-233934

[51] Int. Cl.⁶ .................................................. G11B 5/66
[52] U.S. Cl. .................. 428/64.2; 428/65.3; 428/336; 428/424; 428/432; 428/694 ST; 428/694 SG; 428/900; 427/129; 501/11; 501/53
[58] Field of Search .............. 428/694 ST, 694 SG, 428/64.2, 65.3, 426, 432, 336, 900; 427/129; 501/11, 53

[56] References Cited

U.S. PATENT DOCUMENTS

| | | | |
|---|---|---|---|
| 4,617,817 | 10/1986 | Gegel | 72/364 |
| 4,789,875 | 12/1988 | Wakabayashi | 396/75 |
| 5,391,522 | 2/1995 | Goto et al. | 501/4 |
| 5,476,821 | 12/1995 | Beall | 501/10 |
| 5,624,719 | 4/1997 | Tanabe | 427/577 |
| 5,744,208 | 4/1998 | Beall | 428/64.1 |
| 5,874,376 | 2/1999 | Taguchi | 501/63 |

FOREIGN PATENT DOCUMENTS

| | | |
|---|---|---|
| 634374 | 1/1995 | European Pat. Off. . |
| 239036 | 9/1989 | Japan . |
| 273525 | 12/1991 | Japan . |
| 187711 | 7/1995 | Japan . |
| 169724 | 7/1996 | Japan . |

Primary Examiner—Leszek Kiliman
Attorney, Agent, or Firm—Burns, Doane, Swecker & Mathis, L.L.P.

[57] ABSTRACT

A method for seeking, from an outer circle radius a, an inner circle radius b, and a thickness h of a disc substrate and a deflection Wmax permissive at a time of rotation, a specific elastic modulus G that a material forming the substrate has, Formula (1)

$$G \geq \frac{3(1-\mu^2)a^4}{16w_{max}h^2} \left\{ \left[1-\left(\frac{b}{a}\right)^4\right] + 2\left[1-\left(\frac{b}{a}\right)^2\right] \times \right.$$

$$\left( \frac{(3+\mu)+2(1-\mu)\left(\frac{b}{a}\right)^2 - \frac{(1-\mu)\left(\frac{b}{a}\right)^4 + 4(1-\mu)\left(\frac{b}{a}\right)^2 \log\left(\frac{b}{a}\right)}{(1+\mu)+\left(\frac{b}{a}\right)^2(1-\mu)}}{(1+\mu)+\left(\frac{b}{a}\right)^2(1-\mu)} + 4\left(\frac{b}{a}\right)^2 \right)$$

$$\left. \log\left(\frac{b}{a}\right)\left\{ \frac{(3+\mu)+(3-\mu)\left(\frac{b}{a}\right)^2 - 4(1+\mu)\log\left(\frac{b}{a}\right)}{(1+\mu)+\left(\frac{b}{a}\right)^2(1-\mu)} \right\} \right\}$$

The material for providing a substrate for information recording media having a thickness h of 0.6 millimeter and a deflection Wmax of 1.4 micrometer has a specific elastic modulus G satisfying above Formula (1).

33 Claims, 2 Drawing Sheets

METHOD FOR SELECTING A MATERIAL SUITABLE FOR A SUBSTRATE FOR INFORMATION RECORDING MEDIA, MATERIAL SELECTED USING THIS METHOD, AND MAGNETIC DISK FORMED USING THIS MATERIAL

BACKGROUND OF THE INVENTION

1. Field of the Invention

This invention relates to a seeking method for an optimum specific elastic modulus G for a disc substrate used for information recording media such as a magnetic disc (hard disc), an optical disc, etc., to a method for selecting a material suitable for a substrate for information recording media having the optimum specific elastic modulus G given from the seeking method, to a material for providing a substrate for information recording media having the optimum specific elastic modulus G sought in application of the seeking method, to a substrate for information recording media using the material having the optimum specific elastic modulus G, and to a magnetic disc using this substrate. According to this invention, provided are a material for information recording media substrate having the optimum specific elastic modulus G corresponding to a trend of thinner substrates, a substrate for information recording media, and a hard disc.

2. Description of Related Art

Hard disc drivers (HDD) are required these days to increase the recording capacity of the drivers corresponding to higher performances of personal computers. Smaller and thinner disc substrates are also predicted corresponding to reduced sizes and higher performances of personal computers. A disc substrate of 2.5 inches in diameter is expected in future to have a thickness of 0.43 millimeter, or even 0.381 millimeter, from currently 0.631 millimeter. The rotation number of the disc, or the disc speed, is also expected to be higher to 14,000 rpm from currently 7,200 rpm.

As such a disc substrate is made thinner, however, the substrate tends to suffer deflection and warp. Concurrently, flying height of a magnetic head is reduced to increase the recording density, so that such deflection and warp may cause breakdown of the magnetic disc. When a glass substrate that has been used currently for hard disc drivers is made thinner, however, problems due to deflection and warp may become apparent, and the drivers may fail to follow the trend of thinner dimensions. It is also expected that an increased stress will be applied to a substrate under higher-rotational speed. It has not been known whether a substrate currently used is workable under such an increased stress.

To provide substrates fitting trends of smaller, thinner dimensions and higher-rotational speed, new materials need to be developed. However, it is unclear, at this stage, which material having what physical and mechanical characteristics makes disc substrates having a permissible range of deflection, warp, and, further, strength, etc. Although a specific elastic modulus (=Young's modulus/specific gravity) that the substrate material has as an index to deflection and warp of the substrate is known, it is unknown that the substrate material has to have what specific elastic modulus to keep the deflection and warp within the permissible range when the disc size (diameter and thickness) is changed.

It is therefore the first object of the invention to provide a seeking method for an optimum specific elastic modulus G that a material forming a substrate has, from the size of the substrate and a deflection Wmax permissible at a time of rotation, where the substrate is a disc substrate for information recording media such as a magnetic disc (hard disc), an optical disc, etc., and a method for selecting a material suitable for a substrate for information recording media in use of this seeking method.

It is the second object of the invention to provide, in use of the method, a material suitable for a substrate for information recording media meeting trends of smaller and thinner sizes, and higher-rotational speed opertations.

It is the third object of the invention to provide a substrate using the material above and a magnetic disc using such a substrate.

SUMMARY OF THE INVENTION

This invention to solve the above problems is described as follows:

In one form of the invention, a method for seeking, from an outer circle radius a, an inner circle radius b, and a thickness h of the disc substrate and a deflection Wmax permissible when the disc substrate rotates, an optimum specific modulus G that a material forming a disc substrate has, wherein the optimum specific modulus G is sought according to following Formula (1).

$$G \leq \frac{3(1-\mu^2)a^4}{16 w_{max} h^2} \left\{ \left[1 - \left(\frac{b}{a}\right)^4\right] + 2\left[1 - \left(\frac{b}{a}\right)^2\right] \times \right.$$

$$\left( \frac{(3+\mu) + 2(1-\mu)\left(\frac{b}{a}\right)^2 - (1-\mu)\left(\frac{b}{a}\right)^4 + 4(1-\mu)\left(\frac{b}{a}\right)^2 \log\left(\frac{b}{a}\right)}{(1+\mu) + \left(\frac{b}{a}\right)^2 (1-\mu)} \right) +$$

$$\left. 4\left(\frac{b}{a}\right)^2 \log\left(\frac{b}{a}\right) \left( \frac{(3+\mu) + (3-\mu)\left(\frac{b}{a}\right)^2 - 4(1+\mu)\log\left(\frac{b}{a}\right)}{(1+\mu) + \left(\frac{b}{a}\right)^2 (1-\mu)} \right) \right\}$$

(wherein 1/Wmax denotes stiffness of the substrate (that is, an inverse of the substrate's deflection Wmax); μ denotes the Poisson's ratio of the substrate; a denotes the outer circle radius of the substrate; b denotes the inner circle radius of the substrate; h denotes the thickness of the substrate.)

In another form of the invention, where a material is for providing an information recording media substrate having a thickness h of 0.6 millimeter or less and a deflection Wmax of 1.4 micrometer or less, the material has $$G \geq \frac{3(1-\mu^2)a^4}{16 w_{max} h^2} \left\{ \left[1 - \left(\frac{b}{a}\right)^4\right] + \right. \tag{1}$$

-continued $$2\left[1-\left(\frac{b}{a}\right)^2\right] \times \left(\frac{(3+\mu)+2(1-\mu)\left(\frac{b}{a}\right)^2 - \frac{(1-\mu)\left(\frac{b}{a}\right)^4 + 4(1-\mu)\left(\frac{b}{a}\right)^2 \log\left(\frac{b}{a}\right)}{\left((1+\mu)+\left(\frac{b}{a}\right)^2(1-\mu)\right)}\right) +$$

$$4\left(\frac{b}{a}\right)^2 \log\left(\frac{b}{a}\right) \left\{\frac{(3+\mu)+(3-\mu)\left(\frac{b}{a}\right)^2 - 4(1+\mu)\log\left(\frac{b}{a}\right)}{(1+\mu)+\left(\frac{b}{a}\right)^2(1-\mu)}\right\}$$

(wherein 1/Wmax denotes stiffness of the substrate (that is, an inverse of the substrate's deflection Wmax); $\mu$ denotes the Poisson's ratio of the substrate; a denotes the outer circle radius of the substrate; b denotes the inner circle radius of the substrate; h denotes the thickness of the substrate.)

In yet another form of the invention, where a material is for providing an information recording media substrate standardized with 2.5 inch diameter having a thickness h of 0.6 millimeter or less and a deflection Wmax of 1.4 micrometer or less, the material has a specific elastic modulus G satisfying following Formula (2).

$$G \geq [13.5(1-\mu^2)a^4]/[16\ Wmax \cdot h^2] \qquad (2)$$

(wherein Wmax denotes deflection of the substrate; $\mu$ denotes the Poisson's ratio of the substrate; a denotes the outer circle radius of the substrate.)

In a further form of the invention, an information recording media substrate is made of the material described above. Such an information recording media substrate, according to one embodiment, has a thickness h of 0.6 millimeter or less and a deflection Wmax of 1.4 micrometer or less where made of the material having the specific elastic modulus G satisfying Formula (1) or (2) described above. According to another embodiment, such an information recording media substrate has a thickness of 0.43 millimeter or less and a deflection Wmax of 1.4 micrometer or less where made of the material having the specific elastic modulus G satisfying Formula (1) or (2) described above.

In an even further form of the invention, a magnetic disc includes a magnetic layer on the substrate as described above.

DESCRIPTION OF PREFERRED EMBODIMENTS

Figure 1:
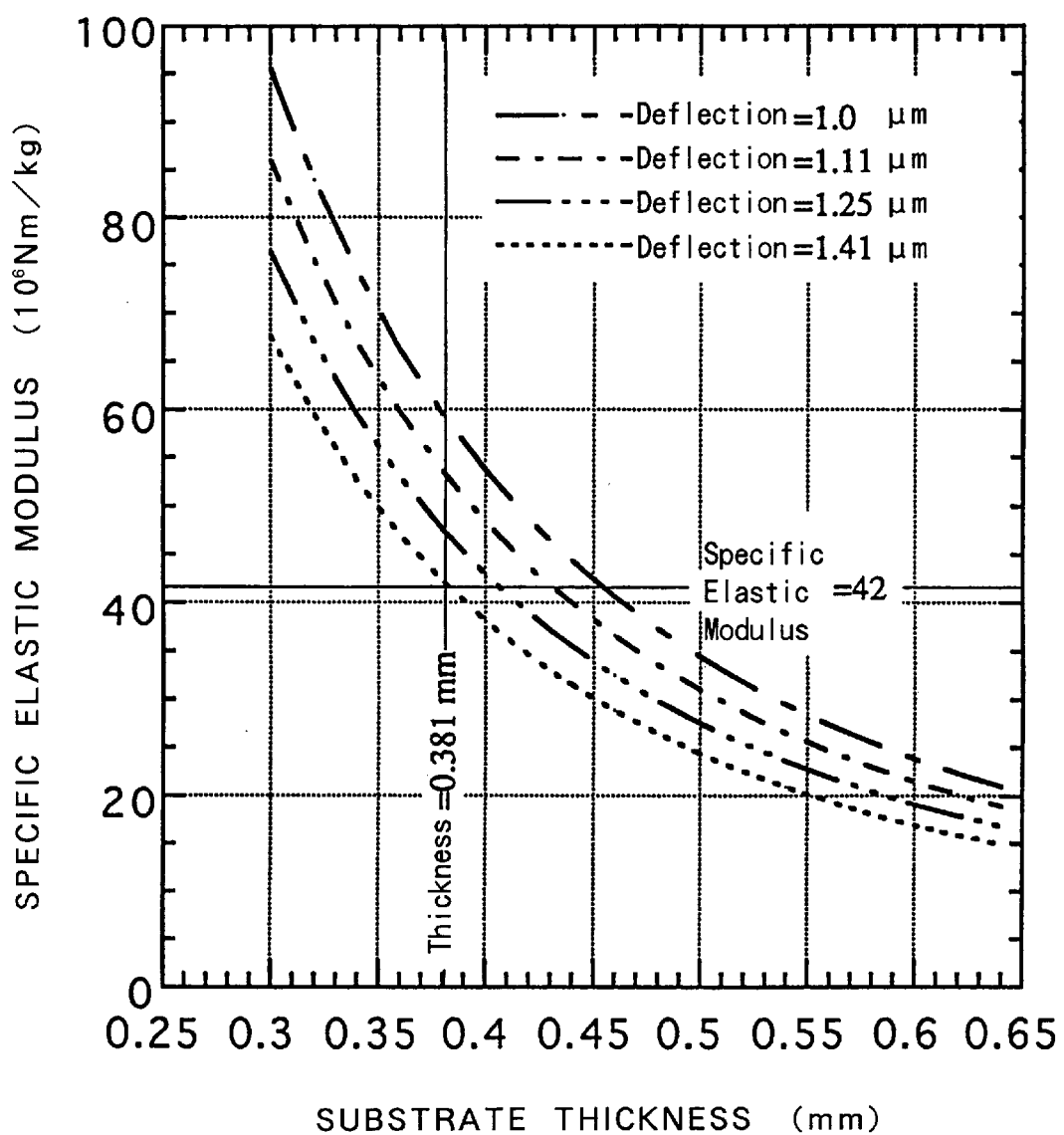
FIG. 1 is a diagram showing relationship between specific elastic modulus G of the substrate material and thickness h of the substrate, with respect to deflections Wmax of 1.0, 1.11, 1.25, and 1.41 micrometer, sought by Formula (1)

A seeking method for specific elastic modulus G according to the invention is applicable to any disc substrate constituted of various materials, e.g., glass, aluminum, etc., and applicable notwithstanding the substrate material.

In Formula (1), letters a, b, and h denote an outer circle radius, an inner circle radius, and a thickness, respectively, of a substrate to be formed. Letter $\mu$ denotes a Poisson's ratio of the substrate material, which is an inherent nature of the material. 1/Wmax is stiffness of the substrate, obtained as an inverse of a deflection Wmax that is permissible when the disc substrate rotates. The deflection Wmax permissible while rotating tends to be smaller as the thickness of the disc is more reduced.

Upon setting each value of a, b, h, $\mu$, and Wmax, a specific elastic modulus G is sought based on above Formula (1). The specific elastic modulus G needed for the substrate is thus given by setting the certain size and the deflection Wmax permissible at a time of rotation, thereby making easier finding of the materials.

Thus, with this method of the invention, a specific elastic modulus G at which the deflection Wmax is within a permissible range can be found in use of Formula (1) according to reduction of the thickness of the substrate, e.g., from 0.6 millimeter level to 0.5 millimeter level, or even to 0.4 millimeter level, and a material having such a specific elastic modulus G can be selected as the material of the substrate.

According to the invention, a material can be selected from materials sought by the above method of the invention to provide a substrate for information recording media having a disc shape of an outer circle radius a, an inner circle radius b, and a thickness h, and a deflection Wmax permissible at a time of rotation. Formula (1) not only gives directions at a stage of new material developments but also allows designers to easily choose materials suitable for a specific substrate among existing materials. As existing materials here, exemplified are, e.g., chemically reinforced glass described in Japanese Unexamined Patent Publication No. Hei, 1-239,036, crystallized glass described in U.S. Pat. No. 5,391,522 and alkali-free glass described in Japanese Unexamined Patent Publication No. Hei, 8-169,724.

The material for providing a substrate for information recording media of the invention is a material for providing a substrate for information recording media having a thickness h of 0.6 millimeter or less and a deflection Wmax of 1.4 micrometer or less, and the material has the specific elastic modulus G sought from Formula (1). Alternatively, the material for providing a substrate for information recording media of the invention is a material for providing an information recording media substrate standardized with 2.5 inch diameter having a thickness h of 0.6 millimeter or less and a deflection Wmax of 1.4 micrometer or less, and the material has the specific elastic modulus G sought from Formula (2). Formula (2) is a simplified formula where b/a=10.0/32.5 [because of standardization of 2.5 inch diameter] and $\mu$=0.29 [an average of glass of the invention] are introduced into Formula (1). The specific elastic modulus G given by Formula (2) is approximate to that given by Formula (1), and the information recording media substrate can be provided from the material having such a specific elastic modulus G.

To follow the thinner trend of the substrate, the thickness h has to be 0.6 millimeter or less. It is desirable for the substrate, as a thickness h becomes thinner, because the hard disc driver can be made thinner. The deflection Wmax is 1.4 micrometer or less. If the deflection Wmax exceeds 1.4 micrometer, there arises a problem such that, in the case of a hard disc driver, a head may lose flying stability and fail to record or replay data stably. There is a trend that a space between the disc and the head becomes narrower for higher density recording, and therefore, the deflection Wmax is desirably made smaller, e.g., 1.25 micrometer or less, preferably.

From a view point to correspond to trends of thinner substrates and higher density recording, it is preferable that a material has a specific elastic modulus satisfying Formula (1) where the thickness h is 0.43 millimeter or less and the deflection Wmax is 1.25 micrometer or less.

FIG. 1 shows results sought for relationship between thickness h and specific elastic modulus G of the substrate with respect to some permissive deflections Wmax. It is to be noted that the deflections of the substrate are obtained from values (1.413 micrometer) of a currently used glass substrate (see, Japanese Unexamined Patent Publication No. Hei, 3-273,525).

From Formula (1) and the results shown in FIG. 1, it is turned out that in the case of a glass substrate having a diameter of 2.5 inches, a material having a specific elastic modulus G of $36 \times 10^6$ Nm/kg or greater is suitable for forming the substrate having a thickness h of 0.43 millimeter or less and a deflection Wmax of 1.25 micrometer or less.

An information recording media substrate of the invention is formed of the material according to the invention. For example, a magnetic recording media can be exemplified as an information recording media; a magnetic disc such as a hard disc can be exemplified as a magnetic recording media. The substrate according to the invention is an information recording media substrate made of a material having a specific elastic modulus G having values satisfying Formula (1) or (2), and the substrate has a thickness of 0.6 millimeter or less and a deflection Wmax of 1.4 micrometer or less. From a view point to correspond to trends of thinner substrates and higher density recording, it is preferable that the substrate is an information recording media substrate made of a material having a specific elastic modulus satisfying Formula (1) or (2) and made of a thickness h of 0.43 millimeter or less and a deflection Wmax of 1.4 micrometer or less. In the case of a glass substrate, such a substrate has a specific elastic modulus G of $36 \times 10^6$ Nm/kg or greater based on Formula (1) or (2).

The substrate of the invention preferably has a surface roughness of 9 angstroms or less. A glass substrate having a surface roughness of 9 angstroms or less is preferable because the substrate can be made thinner and make a substrate having excellent flatness of the surface (Ra=9 angstroms or less). If the surface roughness of the substrate exceeds 9 angstroms, there arises a problem that, e.g., a trend of magnetic head's lower flying height, which is required for a trend of higher density recording on magnetic recording media, may be limited. Moreover, the roughness is preferably of 6 angstroms or less. The smoother surface of the substrate, where the substrate is a magnetic disc, reduces a space between the magnetic head and the magnetic disc, thereby enhancing the recording density as an advantage.

Components of glass may be properly selected to obtain a glass having a specific elastic modulus of $36 \times 10^6$ Nm/kg or greater. For example, glasses of $SiO_2$—$Al_2O_3$—RO system (R denotes a bivalent metal) can be obtained by a proper combination of contents of $SiO_2$, $Al_2O_3$, bivalent metals such as MgO, CaO, additive ingredients such as $TiO_2$, $ZrO_2$, $Y_2O_3$, and the like.

Manufacturing methods for the glass and substrate above described are not particularly limited and can be done by known manufacturing methods for various glasses and substrates as they are. For example, glass raw materials of a predetermined proportion are subject to high temperature melting method, or melted in air or in an inert gas atmosphere; the materials are made homogeneous by babbling, adding degassing additives, and stirring; the materials are then formed into a plate glass by a method such as a known press method, a download molding; and finally, a substrate of a desired size and shape is formed after processed by grinding and polishing. It is to be noted that a surface precision can be controlled to be within, e.g., 3 to 5 angstroms by lapping and polishing in use of abrasives such as cerium oxide.

Description of Magnetic Disc

A magnetic disc or hard disc according to the invention includes a magnetic layer on a major surface of the substrate described above. As layers other than the magnetic layer, exemplified are, from a view to functions, an underlying layer, a protective layer, a lubricating layer, a roughness control layer, and the like, which are formed as needed. Various film-forming techniques are used for formations of those layers.

The material for forming the magnetic layer is not particularly limited. As a magnetic layer, for example, Co systems, as well as ferrite systems, iron-rare earth group systems, and the like are exemplified. The magnetic layer can be for either horizontal or vertical magnetic recording. As a magnetic layer, more specifically, exemplified are, e.g., magnetic thin films containing Co as a main component such as CoPt, CoCr, CoNi, CoNiCr, CoCrTa, CoPtCr, CoNiCrPt, CoNiCrTa, CoCrPtTa, CoCrPtSiO. The magnetic layer can has a multilayer constitution formed by separating magnetic layers with non-magnetic layers in order to reduce noises.

The underlying layer for the magnetic layer is selected according to the magnetic layer. As an underlying layer, exemplified are one or more materials chosen from non-magnetic metals such as Cr, Mo, Ta, Ti, W, V, B, and Al, and oxides, nitrides, carbides, and the like of those metals. For a magnetic layer having Co as a main component, it is preferable to form a pure Cr or Cr alloy for improvement of magnetic characteristics. The underlying layer is not limited to a single layer and can be a multilayer constitution in which the same or different layers are stacked. Multi-layered underlying layers such as Al/Cr/CrMo, Al/Cr/Cr, and the like are exemplified.

A roughness control layer may be formed between the substrate and the magnetic layer or on the magnetic layer to prevent the magnetic head from clinging to the magnetic disc. Formation of the roughness control layer properly adjusts the surface roughness of the magnetic disc, thereby preventing the magnetic head from clinging to the magnetic disc, and thereby creating a highly reliable magnetic disc. Various materials and methods for forming the roughness control layer have been known and are not particularly limited. For example, as a material for the roughness control layer, exemplified are one or more metals chosen from Al, Ag, Ti, Nb, Ta, Bi, Si, Zr, Cr, Cu, Au, Sn, Pd, Sb, Ge, Mg, and the like, and alloy of those metals, and oxides, nitrides, carbides, and the like of those metals. From a view to form the layer readily, a metal having aluminum as a main component such as pure Al, Al alloy, aluminum oxide, or aluminum nitride is preferable. For good head positional stability, it is preferred that the surface roughness of the roughness control layer is 50 to 300 angstroms as Rmax. More preferably, the Rmax is 100 to 200 angstroms. When the Rmax is less than 50 angstroms, since the disc surface is nearly flat, the magnetic head and the magnetic disc may cling to each other, thereby likely creating unfavorable results such as damaging the magnetic head or the magnetic disc, or even causing a head clash. On the other hand, when the Rmax exceeds 300 angstroms, a glide height may be too large, thereby causing unfavorable impairments of recording density. A suitable roughness may be given without forming a roughness control layer by a texturing treatment where uneven surface is formed on a glass substrate by means of etching or radiation of laser beam.

As a protective layer, for example, a chromium film, a chromium alloy film, a carbon film, a zirconia layer, a silica layer, and the like are exemplified. Those protective films can be successively formed by an inline sputtering apparatus together with the underlying layer, the magnetic layer, and the like. Those protective layers can be a single film or a multilayer constitution made of the same or different films.

Other protective layer or layers may be formed on or in lieu of the protective layer. For example, a silicon oxide ($SiO_2$) film may be formed on the protective layer by applying tetraalkoxysilane diluted in an alcoholic solvent in which colloidal silica fine particles are further dispersed and sintering the applied layer. In this case, the film serves as the protective layer and the roughness control layer.

While various kinds of layers have been proposed as the lubricating layer, the lubricating layer is generally formed by applying perfluoropolyether as a liquid lubricating agent upon diluted in a solvent of fluorocarbon or the like by dipping, spin-coating, or spraying on the media surface and subjecting the coated layer to a heat treatment as needed.

EXAMPLES

This invention will be more specifically described as follows, based on examples.
Manufacturing Method for Glass Substrate for Hard Disc This invention will be described in details based on examples.

EXAMPLES 1 to 61

As a starting material, $SiO_2$, $Al_2O_3$, $Al(OH)_3$, MgO, $CaCO_3$, $Y_2O_3$, $TiO_2$, $ZrO_2$, $Li_2O$ and the like were weighed in prescribed ratios into 250 to 300 grams portions, mixed sufficiently to form formulated batches, put in a platinum crucible, and melted to form glass in air for 3 to 5 hours at 1550 degrees Celsius. After melting, the glass melting liquid was cast into a predetermined carbon mold, left to cool down to the glass transition temperature, then, immediately put in an anneal furnace to be annealed for about one hour in a range of the glass transition temperature, and cooled down to the room temperature in the furnace. The obtained glass did not show any crystal observable with a microscope.

The obtained glass samples were sliced into a disc shape, and substrates for magnetic disc having an outer circle radius of 32.5 millimeters, an inner circle radius of 10.0 millimeters, and a thickness of 0.43 millimeter were formed by polishing the major surfaces with cerium oxide. Tables 1 to 8 show compositions of the obtained magnetic discs, and measured results of surface roughness (Ra), specific gravity, Young's modulus, specific elastic modulus, and deflection.

TABLE 1

| Example | 1 | 2 | 3 | 4 | 5 | 6 | 7 | 8 |
|---|---|---|---|---|---|---|---|---|
| (mol %) | | | | | | | | |
| $SiO_2$ | 49.00 | 45.00 | 44.00 | 45.00 | 40.00 | 45.00 | 45.00 | 34.00 |
| $Al_2O_3$ | 21.00 | 20.00 | 17.00 | 12.50 | 12.50 | 10.00 | 7.50 | 17.00 |

TABLE 1-continued

| Example | 1 | 2 | 3 | 4 | 5 | 6 | 7 | 8 |
|---|---|---|---|---|---|---|---|---|
| (mol %) | | | | | | | | |
| MgO | 25.00 | 25.00 | 21.00 | 30.00 | 30.00 | 30.00 | 30.00 | 15.00 |
| CaO | 5.00 | 10.00 | 14.00 | 5.00 | 5.00 | 5.00 | 5.00 | 20.00 |
| $Y_2O_3$ | — | — | — | 7.50 | 7.50 | 5.00 | 5.00 | — |
| $TiO_2$ | — | — | 4.00 | — | 5.00 | 5.00 | — | 14.00 |
| $ZrO_2$ | — | — | — | — | — | — | 5.00 | — |
| $Li_2O$ | — | — | — | — | — | — | — | — |
| Surface roughness Ra (Å) | 3 | 4 | 4 | 4 | 4 | 4 | 5 | 4 |
| Specific gravity (g/cc) | 2.72 | 2.72 | 2.82 | 3.17 | 3.26 | 3.11 | 3.43 | 2.97 |
| Young's modulus (Gpa) | 108.8 | 107.4 | 108.4 | 119.9 | 125.1 | 118.9 | 126.8 | 113.5 |
| Poisson's ratio | 0.277 | 0.28 | 0.281 | 0.289 | 0.296 | 0.287 | 0.285 | 0.284 |
| Specific elastic modulus ($10^6$ Nm/kg) | 40 | 39.5 | 38.4 | 37.8 | 38.4 | 38.2 | 37.00 | 38.2 |
| h = 0.5 mm Deflection (μm) | 0.87 | 0.88 | 0.90 | 0.91 | 0.89 | 0.90 | 0.93 | 0.90 |
| h = 0.43 mm Deflection (μm) | 1.18 | 1.19 | 1.22 | 1.23 | 1.20 | 1.22 | 1.26 | 1.22 |

TABLE 2

| Example | 9 | 10 | 11 | 12 | 13 | 14 | 15 | 16 |
|---|---|---|---|---|---|---|---|---|
| (mol %) | | | | | | | | |
| $SiO_2$ | 30.00 | 35.00 | 35.00 | 35.00 | 40.00 | 40.00 | 35.00 | 40.00 |
| $Al_2O_3$ | 15.00 | 15.00 | 17.00 | 15.00 | 20.00 | 25.00 | 15.00 | 15.00 |
| MgO | 15.00 | 15.00 | 20.00 | 20.00 | 30.00 | 15.00 | 15.00 | 15.00 |
| CaO | 20.00 | 15.00 | 13.00 | 10.00 | — | 10.00 | 20.00 | 20.00 |
| $Y_2O_3$ | — | — | — | 5.00 | 5.00 | 5.00 | — | — |
| $TiO_2$ | 20.00 | 20.00 | 15.00 | 15.00 | 5.00 | 5.00 | 15.00 | 10.00 |
| $ZrO_2$ | — | — | — | — | — | — | — | — |
| $Li_2O$ | — | — | — | — | — | — | — | — |
| Surface roughness Ra (Å) | 5 | 5 | 4 | 4 | 4 | 4 | 5 | 4 |
| Specific gravity (g/cc) | 3.11 | 3.04 | 2.97 | 3.23 | 3.10 | 3.06 | 2.99 | 2.91 |
| Young's modulus (Gpa) | 119.5 | 120.0 | 116.5 | 123.9 | 124.5 | 118.3 | 113.4 | 109.2 |
| Poisson's ratio | 0.286 | 0.278 | 0.281 | 0.289 | 0.289 | 0.286 | 0.284 | 0.282 |
| Specific elastic modulus ($10^6$ Nm/kg) | 38.4 | 39.4 | 39.2 | 38.3 | 40.2 | 38.6 | 37.9 | 37.5 |
| h = 0.5 mm Deflection (μm) | 0.90 | 0.88 | 0.88 | 0.90 | 0.86 | 0.89 | 0.91 | 0.92 |
| h = 0.43 mm Deflection (μm) | 1.21 | 1.19 | 1.20 | 1.21 | 1.16 | 1.21 | 1.23 | 1.25 |

TABLE 3

| Example | 17 | 18 | 19 | 20 | 21 | 22 | 23 | 24 |
|---|---|---|---|---|---|---|---|---|
| (mol %) | | | | | | | | |
| $SiO_2$ | 45.00 | 50.00 | 35.00 | 40.00 | 40.00 | 40.00 | 40.00 | 35.00 |
| $Al_2O_3$ | 15.00 | 15.00 | 25.00 | 15.00 | 20.00 | 20.00 | 20.00 | 33.00 |
| MgO | 15.00 | 15.00 | 15.00 | 25.00 | 25.00 | 20.00 | 15.00 | 7.00 |
| CaO | 20.00 | 20.00 | 20.00 | 10.00 | 5.00 | 10.00 | 15.00 | 18.00 |
| $Y_2O_3$ | — | — | 5.00 | 5.00 | 5.00 | 5.00 | 5.00 | 5.00 |
| $TiO_2$ | 5.00 | — | 10.00 | 5.00 | 5.00 | 5.00 | 5.00 | 2.00 |
| $ZrO_2$ | — | — | — | — | — | — | — | — |
| $Li_2O$ | — | — | — | — | — | — | — | — |
| Surface roughness Ra (Å) | 4 | 4 | 5 | 4 | 4 | 4 | 4 | 4 |

TABLE 3-continued

| | (mol %) | | | | | | | |
|---|---|---|---|---|---|---|---|---|
| Example | 17 | 18 | 19 | 20 | 21 | 22 | 23 | 24 |
| Specific gravity (g/cc) | 2.83 | 2.75 | 3.15 | 3.14 | 3.10 | 3.11 | 3.12 | 3.045 |
| Young's modulus (Gpa) | 105.1 | 101.9 | 122.5 | 119.4 | 121.7 | 119.0 | 117.0 | 116.4 |
| Poisson's ratio | 0.279 | 0.275 | 0.284 | 0.287 | 0.288 | 0.286 | 0.285 | 0.287 |
| Specific elastic modulus ($10^6$ Nm/kg) | 37.1 | 37.1 | 38.9 | 38.1 | 39.3 | 38.3 | 37.5 | 38.2 |
| h = 0.5 mm Deflection (μm) | 0.94 | 0.94 | 0.89 | 0.90 | 0.88 | 0.90 | 0.92 | 0.90 |
| h = 0.43 mm Deflection (μm) | 1.27 | 1.27 | 1.20 | 1.22 | 1.18 | 1.22 | 1.24 | 1.22 |

TABLE 4

| | (mol %) | | | | | | | |
|---|---|---|---|---|---|---|---|---|
| Example | 25 | 26 | 27 | 28 | 29 | 30 | 31 | 32 |
| $SiO_2$ | 40.00 | 45.00 | 45.00 | 45.00 | 42.00 | 43.00 | 45.00 | 41.00 |
| $Al_2O_3$ | 30.00 | 25.00 | 25.00 | 25.00 | 28.00 | 25.00 | 25.00 | 27.00 |
| MgO | 7.00 | 15.00 | 12.00 | 10.00 | 8.00 | 15.00 | 22.00 | 20.00 |
| CaO | 13.00 | 10.00 | 10.00 | 10.00 | 15.00 | 10.00 | — | — |
| $Y_2O_3$ | 5.00 | — | — | — | 3.50 | — | 1.00 | 4.00 |
| $TiO_2$ | 5.00 | 5.00 | 8.00 | 5.00 | 3.50 | 5.00 | 7.00 | 8.00 |
| $ZrO_2$ | — | — | — | — | — | 2.00 | — | — |
| $Li_2O$ | — | — | — | 5.00 | — | — | — | — |
| Surface roughness Ra (Å) | 5 | 4 | 5 | 4 | 3 | 4 | 3 | 4 |
| Specific gravity (g/cc) | 3.04 | 2.78 | 2.795 | 2.724 | 2.952 | 2.841 | 2.836 | 3.024 |
| Young's modulus (Gpa) | 116.1 | 109.7 | 109.7 | 107.4 | 118.5 | 112.0 | 116.0 | 123.1 |
| Poisson's ratio | 0.282 | 0.278 | 0.277 | 0.272 | 0.278 | 0.280 | 0.275 | 0.282 |
| Specific elastic modulus ($10^6$ Nm/kg) | 38.2 | 39.5 | 39.2 | 39.4 | 40.1 | 39.5 | 40.8 | 40.8 |
| h = 0.5 mm Deflection (μm) | 0.91 | 0.88 | 0.89 | 0.89 | 0.87 | 0.88 | 0.85 | 0.85 |
| h = 0.43 mm Deflection (μm) | 1.23 | 1.19 | 1.20 | 1.20 | 1.17 | 1.19 | 1.15 | 1.15 |

TABLE 5

| | (mol %) | | | | | | | |
|---|---|---|---|---|---|---|---|---|
| Example | 33 | 34 | 35 | 36 | 37 | 38 | 39 | 40 |
| $SiO_2$ | 40.00 | 40.00 | 35.00 | 40.00 | 37.00 | 36.00 | 36.50 | 38.00 |
| $Al_2O_3$ | 27.00 | 32.00 | 33.00 | 32.00 | 35.00 | 35.00 | 33.00 | 32.00 |
| MgO | 17.00 | 17.00 | — | — | — | — | — | — |
| CaO | — | — | 25.00 | 20.00 | 16.00 | 19.00 | 22.00 | 15.00 |
| $Y_2O_3$ | 8.00 | 8.00 | 5.00 | 8.00 | 5.00 | 5.00 | 4.00 | 5.00 |
| $TiO_2$ | 8.00 | 3.00 | 2.00 | — | — | 2.00 | — | — |
| $ZrO_2$ | — | — | — | — | — | — | — | — |
| $Li_2O$ | — | — | — | — | 7.00 | 5.00 | 2.50 | 10.00 |
| Surface roughness Ra (Å) | 4 | 4 | 4 | 4 | 5 | 4 | 4 | 4 |
| Specific gravity (g/cc) | 3.218 | 3.167 | 3.028 | 3.114 | 2.933 | 2.963 | 2.952 | 2.905 |
| Young's modulus (Gpa) | 127.3 | 127.4 | 112.4 | 116.0 | 113.0 | 112.4 | 112.1 | 111.4 |
| Poisson's ratio | 0.284 | 0.286 | 0.282 | 0.286 | 0.275 | 0.274 | 0.276 | 0.277 |
| Specific elastic modulus ($10^6$ Nm/kg) | 39.5 | 40.2 | 37.1 | 37.2 | 38.6 | 38.3 | 38.0 | 38.3 |

TABLE 5-continued

| | (mol %) | | | | | | | |
|---|---|---|---|---|---|---|---|---|
| Example | 33 | 34 | 35 | 36 | 37 | 38 | 39 | 40 |
| h = 0.5 mm Deflection (μm) | 0.87 | 0.86 | 0.93 | 0.93 | 0.90 | 0.91 | 0.92 | 0.91 |
| h = 0.43 mm Deflection (μm) | 1.18 | 1.16 | 1.26 | 1.25 | 1.22 | 1.23 | 1.24 | 1.23 |

TABLE 6

| | (mol %) | | | | | | | |
|---|---|---|---|---|---|---|---|---|
| Example | 41 | 42 | 43 | 44 | 45 | 46 | 47 | 48 |
| $SiO_2$ | 35.00 | 43.00 | 41.00 | 40.00 | 40.00 | 44.00 | 40.00 | 40.00 |
| $Al_2O_3$ | 37.00 | 30.00 | 30.00 | 25.00 | 30.00 | 25.00 | 15.00 | 12.50 |
| MgO | — | 17.00 | 18.00 | 25.00 | 20.00 | 25.00 | 30.00 | 30.00 |
| CaO | 10.00 | — | — | — | — | — | — | — |
| $Y_2O_3$ | 8.00 | 6.00 | 7.00 | 5.00 | 5.00 | 1.00 | 10.00 | 12.50 |
| $TiO_2$ | — | 4.00 | 4.00 | 5.00 | 5.00 | 5.00 | 5.00 | 5.00 |
| $ZrO_2$ | — | — | — | — | — | — | — | — |
| $Li_2O$ | 10.00 | — | — | — | — | — | — | — |
| Surface roughness Ra (Å) | 5 | 4 | 4 | 4 | 4 | 4 | 4 | 4 |
| Specific gravity (g/cc) | 3.022 | 3.071 | 3.14 | 3.063 | 3.057 | 2.833 | 3.386 | 3.515 |
| Young's modulus (Gpa) | 115.5 | 124.3 | 128.9 | 124.1 | 124.2 | 117 | 129.8 | 131.9 |
| Poisson's ratio | 0.277 | 0.282 | 0.282 | 0.284 | 0.287 | 0.278 | 0.288 | 0.289 |
| Specific elastic modulus ($10^6$ Nm/kg) | 38.2 | 40.5 | 41.1 | 40.5 | 40.6 | 41.3 | 38.3 | 37.5 |
| h = 0.5 mm Deflection (μm) | 0.91 | 0.85 | 0.84 | 0.85 | 0.85 | 0.84 | 0.90 | 0.92 |
| h = 0.43 mm Deflection (μm) | 1.23 | 1.16 | 1.14 | 1.15 | 1.15 | 1.14 | 1.22 | 1.24 |

TABLE 7

| | (mol %) | | | | | | | |
|---|---|---|---|---|---|---|---|---|
| Example | 49 | 50 | 51 | 52 | 53 | 54 | 55 | 56 |
| $SiO_2$ | 44.00 | 44.00 | 44.00 | 40.00 | 40.00 | 40.00 | 40.00 | 40.00 |
| $Al_2O_3$ | 20.00 | 15.00 | 10.00 | 15.00 | 10.00 | 10.00 | 7.50 | 15.00 |
| MgO | 30.00 | 35.00 | 40.00 | 35.00 | 40.00 | 35.00 | 40.00 | 25.00 |
| CaO | — | — | — | — | — | — | — | — |
| $Y_2O_3$ | 1.00 | 1.00 | 1.00 | 5.00 | 5.00 | 10.00 | 7.50 | 15.00 |
| $TiO_2$ | 5.00 | 5.00 | 5.00 | 5.00 | 5.00 | 5.00 | 5.00 | 5.00 |
| $ZrO_2$ | — | — | — | — | — | — | — | — |
| $Li_2O$ | — | — | — | — | — | — | — | — |
| Surface roughness Ra (Å) | 3 | 3 | 4 | 3 | 4 | 3 | 4 | 4 |
| Specific gravity (g/cc) | 2.85 | 2.87 | 2.89 | 3.119 | 3.166 | 3.411 | 3.35 | 3.604 |
| Young's modulus (Gpa) | 116.3 | 116.0 | 116.1 | 123.8 | 125.6 | 129.6 | 128.5 | 134.0 |
| Poisson's ratio | 0.277 | 0.283 | 0.280 | 0.285 | 0.284 | 0.288 | 0.288 | 0.290 |
| Specific elastic modulus ($10^6$ Nm/kg) | 40.8 | 40.6 | 40.2 | 39.7 | 39.7 | 38.0 | 38.4 | 37.2 |
| h = 0.5 mm Deflection (μm) | 0.85 | 0.86 | 0.86 | 0.87 | 0.87 | 0.91 | 0.90 | 0.92 |
| h = 0.43 mm Deflection (μm) | 1.15 | 1.15 | 1.17 | 1.18 | 1.18 | 1.22 | 1.21 | 1.25 |

TABLE 8

| Example | (mol%) | | | | |
|---|---|---|---|---|---|
| | 57 | 58 | 59 | 60 | 61 |
| SiO$_2$ | 35.00 | 43.00 | 40.00 | 40.00 | 45.00 |
| Al$_2$O$_3$ | 15.00 | 21.00 | 25.00 | 17.00 | 25.50 |
| MgO | 35.00 | 30.00 | 25.00 | 35.00 | 23.00 |
| CaO | — | — | — | — | — |
| Y$_2$O$_3$ | 5.00 | 1.00 | 5.00 | 3.00 | 3.00 |
| TiO$_2$ | 10.00 | — | — | — | 2.00 |
| ZrO$_2$ | — | 5.00 | 5.00 | 5.00 | 2.00 |
| Li$_2$O | — | — | — | — | — |
| Surface roughness Ra (Å) | 5 | 4 | 5 | 4 | 4 |
| Specific gravity (g/cc) | 3.225 | 2.952 | 3.152 | 3.110 | 2.97 |
| Young's modulus (Gpa) | 129.5 | 120.0 | 126.4 | 124.7 | 126.5 |
| Poisson's ratio | 0.286 | 0.80 | 0.284 | 0.285 | 0.289 |
| Specific elastic modulus (10$^6$ Nm/kg) | 40.2 | 40.7 | 40.1 | 40.1 | 42.6 |
| h = 0.5 mm Deflection (μm) | 0.86 | 0.85 | 0.86 | 0.86 | 0.81 |
| h = 0.43 mm Deflection (μm) | 1.16 | 1.15 | 1.17 | 1.16 | 1.09 |

When the outer and inner circle radiuses, thickness, specific elastic modulus, and deflection are introduced into Formula (1), each and every example satisfies the relationship given by Formula (1). It was turned out, from those results, that a magnetic disc substrate can be provided with deflection of 1.0 micrometer or less upon using a glass whose specific elastic modulus is 36×10$^6$ Nm/kg or greater.

Manufacturing Method for Hard Disc

Figure 2:
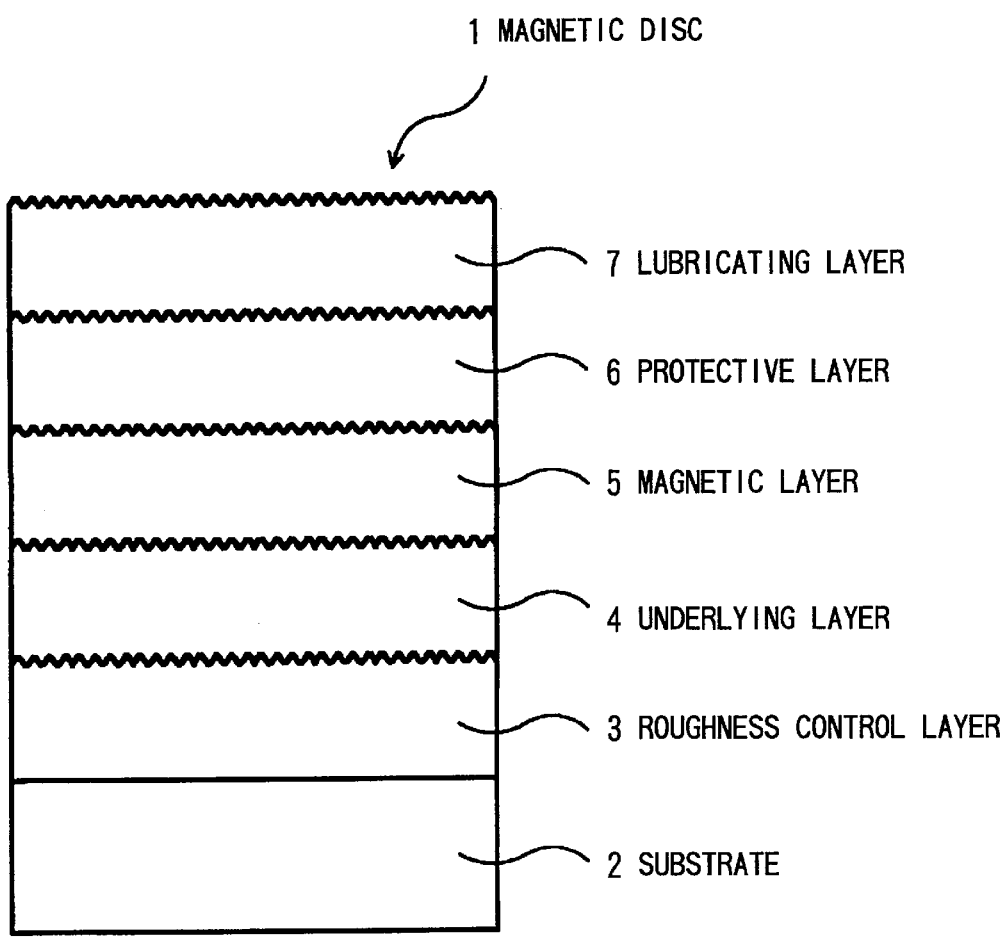
FIG. 2 is a schematic cross section showing a magnetic disc 1 according to this invention in which a roughness control layer 3, an underlying layer 4, a magnetic layer 5, a protective layer 6, a lubricating layer 7 are formed in this order on a glass substrate 2.

As shown in FIG. 2, the magnetic disc 1 according to the invention is formed of, on the glass substrate 2 of Example 1, a roughness control layer 3, an underlying layer 4, a magnetic layer 5, a protective layer 6, and a lubricating layer 7 in this order.

More specifically, the substrate 1 was fabricated to be in a disc shape having an outer circle radius of 32.5 millimeters, an inner circle radius of 10.0 millimeters, and a thickness of 0.43 millimeter. The substrate 1 was precisely polished to render the surface roughness of both major surfaces Ra=4 angstroms and Rmax=40 angstroms. The roughness control layer is an AlN thin film having an anverage roughness of 50 angstroms, a surface roughness Rmax of 150 angstroms, and a nitrogen content of 5 to 35 percent. The underlying layer is a CrV thin film having a thickness of about 600 angstroms whose compositional ratio is that Cr is 83 atomic percent and V is 17 atomic percent. The magnetic layer is a CoPtCr thin film having a thickness of about 300 angstroms whose compositional ration is that Co is 76 atomic percent and Pt is 6.6 atomic percent and Cr is 17.4 atomic percent. The protective layer is a carbon thin film having a thickness of about 100 angstroms. The lubricating layer is formed with a thickness of 8 angstroms by spin-coating a lubricating agent constituted of perfluoropolyether on the carbon protective layer.

The manufacturing method for the magnetic disc according to an embodiment of the invention is now described. First, the glass produced as Example 1 is formed into a disc shape having an outer circle radius of 32.5 millimeters, an inner circle radius of 10.0 millimeters, and a thickness of 0.5 millimeter by grinding or lapping, thereby creating a glass substrate for magnetic disc by precisely polishing both major surfaces of the substrate as to render the surface roughness Ra=4 angtroms and Rmax=40 angstroms. After set into a substrate holder, the glass substrate is fed into a chargaing chamber of an inline sputtering apparatus. The holder on which the glass substrate was set is fed into a first chamber in which an Al target was etched, and the Al target is then subject to sputtering at a pressure of 4 millitorrs, a substrate temperature of 350 degrees Celsius, in an atmosphere of Ar+N$_2$ gas (N$_2$=4 percent). As a result, an AlN thin film (roughness control layer) having a surface roughness Rmax of 150 angstroms and a film thickness of 50 angstroms was formed on the glass substrate.

The holder on which the glass substrate formed with the AlN film is set is transferred to a second chamber in which a CrV target (Cr: 83 atomic percent, V: 17 atomic percent) is installed and then to a third chamber in which a CoPtCt target (Co: 76 atomic percent, Pt: 6.6 atomic percent, Cr: 17.4 atomic percent) is installed, and films are formed on the substrate. By sputtering at a pressure of 2 millitorrs, a substrate temperature of 350 degrees Celsius, in an atmosphere of Ar, formed are films of a CrV underlying layer of a thickness of about 600 angstroms and of a CoPtCr magnetic layer of a thickness of about 300 angstroms.

The substrate on which the roughness control layer, the underlying layer, and the magnetic layer are formed is transferred into a fourth chamber in which a heater is installed to perform a heat treatment. The heat treatment is conducted by rendering the fourth chamber in an Ar gas atmosphere (pressure of 2 millitorrs). The substrate is then transferred into a fifth chamber in which a carbon target is installed, and a carbon protective layer having a thickness of about 100 angstroms is formed under the same film forming condition as that for forming the CrV underlying layer and the CoPtCr magnetic layer except an atmosphere of Ar+H$_2$ gas (H$_2$=6 percent).

Finally, the substrate completed up to formation of the carbon protective layer is taken out of the inline sputter apparatus. Perfluoropolyether was coated on the surface of the carbon protective layer by a dipping method to form a lubricating layer of a thickness of 8 angstroms, thereby forming the magnetic disc.

Although this invention is described by exemplifying preferred embodiments, this invention is not limited to the above embodiments. This invention can provide a seeking method for an optimum specific elastic modulus G that the material forming the substrate has from the size of the substrate and deflection permitted at a time of rotation, where the substrate is a disc substrate for information recording media such as a magnetic disc (hard disc), an optical disc, or the like. According to the invention, a material suitable for forming an information recording media corresponding to trends to render the disc drivers smaller, thinner, and operative with higher speed, can be provided by this method. Moreover, according to the invention, a substrate using the above material and a magnetic disc using this substrate can be provided. This invention allows to calculate a value of a specific elastic modulus of a material needed along with the trends for thinner substrates, to realize thinner substrates by using, as substrates, a material having a specific elastic modulus greater than the value, and to realize an information recording media of higher capacity.

What is claimed is:

1. A method of identifying an optimum specific elastic modulus G of a material forming a disc substrate, said disc substrate having an outer circle radius a, an inner circle radius b, a thickness h, a Poisson's ratio μ, and a permissible deflection Wmax when the disc substrate rotates, wherein the optimum specific modulus G is identified by using the following Formula (1):

$$G \geq \frac{3(1-\mu^2)a^4}{16w_{max}h^2}\left\{\left[1-\left(\frac{b}{a}\right)^4\right]+\right.$$

$$2\left[1-\left(\frac{b}{a}\right)^2\right] \times \left\{\frac{(3+\mu)+2(1-\mu)\left(\frac{b}{a}\right)^2-}{(1-\mu)\left(\frac{b}{a}\right)^4+4(1-\mu)\left(\frac{b}{a}\right)^2\log\left(\frac{b}{a}\right)}\right\}+$$

$$\left. 4\left(\frac{b}{a}\right)^2\log\left(\frac{b}{a}\right)\left\{\frac{(3+\mu)+(3-\mu)\left(\frac{b}{a}\right)^2-4(1+\mu)\log\left(\frac{b}{a}\right)}{(1+\mu)+\left(\frac{b}{a}\right)^2(1-\mu)}\right\}\right\}. \quad (1)$$

2. A method for selecting a material suitable for a disc substrate for information recording media, wherein said material is selected from materials having an optimum specific elastic modulus G as identified according to claim 1.

3. A material suitable for providing a substrate for information recording media, said substrate having a thickness h of 0.6 millimeter or less, a deflection Wmax of 1.4 micrometer or less, a Poisson's ratio $\mu$, an outer circle radius a, and an inner circle radius b, wherein said material has a specific elastic modulus G satisfying the following Formula (1):

$$G \geq \frac{3(1-\mu^2)a^4}{16w_{max}h^2}\left\{\left[1-\left(\frac{b}{a}\right)^4\right]+\right.$$

$$2\left[1-\left(\frac{b}{a}\right)^2\right] \times \left\{\frac{(3+\mu)+2(1-\mu)\left(\frac{b}{a}\right)^2-}{(1-\mu)\left(\frac{b}{a}\right)^4+4(1-\mu)\left(\frac{b}{a}\right)^2\log\left(\frac{b}{a}\right)}\right\}+$$

$$\left. 4\left(\frac{b}{a}\right)^2\log\left(\frac{b}{a}\right)\left\{\frac{(3+\mu)+(3-\mu)\left(\frac{b}{a}\right)^2-4(1+\mu)\log\left(\frac{b}{a}\right)}{(1+\mu)+\left(\frac{b}{a}\right)^2(1-\mu)}\right\}\right\}. \quad (1)$$

4. The material according to claim 3, wherein the material has a specific elastic modulus G satisfying Formula (1) when the substrate has a thickness h of 0.43 millimeter or less and a deflection Wmax of 1.4 micrometer or less.

5. The material according to claim 4, wherein the specific elastic modulus G is 36 or greater.

6. The material according to claim 3, wherein the material is made of glass.

7. A material suitable for providing a substrate for information recording media, said substrate having a standardized diameter of 2.5 inch, a thickness h of 0.6 millimeter or less, a deflection Wmax of 1.4 micrometer or less, a Poisson's ratio $\mu$, and an outer circle radius a, wherein said material has a specific elastic modulus G satisfying the following Formula (2):

$$G \geq [13.5(1-\mu^2)a^4]/[16\ Wmax \cdot h^2] \quad (2).$$

8. The material according to claim 7, wherein the material has a specific elastic modulus G satisfying Formula (2) when the substrate has a thickness of 0.43 millimeter or less and a deflection Wmax of 1.4 micrometer or less.

9. The material according to claim 8, wherein the specific elastic modulus G is 36 or greater.

10. The material according to claim 7, wherein the material is made of glass.

11. A substrate for information recording media, wherein said substrate comprises the material according to claim 3.

12. A substrate for information recording media, wherein said substrate comprises the material according to claim 7.

13. A substrate for information recording media, wherein said substrate comprises the material according to claim 3 and has a thickness h of 0.6 millimeter or less and a deflection Wmax of 1.4 micrometer or less.

14. The substrate according to claim 13, wherein the specific elastic modulus G is 36 or greater.

15. The substrate according to claim 13, wherein the substrate is made of glass.

16. The substrate according to claim 15, wherein the substrate has a surface roughness Ra of 9 angstroms or less.

17. The substrate according to claim 13, wherein the information recording media is a magnetic disc.

18. A substrate for information recording media, wherein said substrate comprises the material according to claim 7 and has a thickness h of 0.6 millimeter or less and a deflection Wmax of 1.4 micrometer or less.

19. The substrate according to claim 18, wherein the specific elastic modulus is 36 or greater.

20. The substrate according to claim 18, wherein the substrate is made of glass.

21. The substrate according to claim 20, wherein the substrate has a surface roughness Ra of 9 angstroms or less.

22. A substrate for information recording media, wherein said substrate comprises the material according to claim 3 and has a thickness h of 0.43 millimeter or less and a deflection Wmax of 1.4 micrometer or less.

23. The substrate according to claim 22, wherein the specific elastic modulus G is 36 or greater.

24. The substrate according to claim 22, wherein the substrate is made of glass.

25. The substrate according to claim 24, wherein the substrate has a surface roughness Ra of 9 angstroms or less.

26. A substrate for information recording media, wherein said substrate comprises the material according to claim 7 and has a thickness h of 0.43 millimeter or less and a deflection Wmax of 1.4 micrometer or less.

27. The substrate according to claim 26, wherein the specific elastic modulus G is 36 or greater.

28. The substrate according to claim 26, wherein the substrate is made of glass.

29. The substrate according to claim 28, wherein the substrate has a surface roughness Ra of 9 angstroms or less.

30. A magnetic disc comprising a substrate according to claim 13 and a magnetic layer thereon.

31. A magnetic disc comprising a substrate according to claim 18 and a magnetic layer thereon.

32. A magnetic disc comprising a substrate according to claim 22 and a magnetic layer thereon.

33. A magnetic disc comprising a substrate according to claim 26 and a magnetic layer thereon.

* * * * *